(12) United States Patent
Jarman

(10) Patent No.: US 6,892,539 B2
(45) Date of Patent: May 17, 2005

(54) ROTARY HEAT ENGINE

(76) Inventor: John Warner Jarman, 257 Chiremba Road, Hatfield, Harare (ZW)

( * ) Notice: Subject to any disclaimer, the term of this patent is extended or adjusted under 35 U.S.C. 154(b) by 0 days.

(21) Appl. No.: 10/727,115

(22) Filed: Dec. 3, 2003

(65) Prior Publication Data
US 2004/0144092 A1 Jul. 29, 2004

(30) Foreign Application Priority Data
Jan. 6, 2003 (ZW) .............................................. 1/2003

(51) Int. Cl.$^7$ ............................................. B60K 16/00
(52) U.S. Cl. ....................................... 60/641.8; 60/670
(58) Field of Search ........................ 60/517, 670, 641.8

(56) References Cited

U.S. PATENT DOCUMENTS

| 1,911,456 | A | | 5/1933 | Lyon | |
|---|---|---|---|---|---|
| 3,490,996 | A | | 1/1970 | Kelly | |
| 3,769,796 | A | * | 11/1973 | Bechtold | ...................... 60/227 |
| 3,962,874 | A | * | 6/1976 | Doerner | ...................... 60/669 |
| 3,984,985 | A | | 10/1976 | Lapeyre | |
| 4,012,911 | A | | 3/1977 | Gulko | |
| 4,022,024 | A | | 5/1977 | Abeles | |
| 4,121,420 | A | | 10/1978 | Schur | |
| 4,141,218 | A | | 2/1979 | Rayboy | |
| 4,195,483 | A | | 4/1980 | Myers et al. | |
| 4,236,377 | A | | 12/1980 | Weinert | |
| 4,242,591 | A | | 12/1980 | Harville | |
| 4,246,885 | A | | 1/1981 | Austin | |
| 4,258,551 | A | * | 3/1981 | Ritzi | ........................... 60/654 |
| 4,307,571 | A | | 12/1981 | Jackson | |
| 4,317,046 | A | | 2/1982 | Holmberg | |
| 4,398,391 | A | * | 8/1983 | English, Jr. | .............. 60/641.15 |
| 4,414,814 | A | | 11/1983 | White | |
| 4,503,676 | A | | 3/1985 | Rutledge | |
| 4,570,444 | A | | 2/1986 | Gould | |
| 4,598,550 | A | | 7/1986 | Abbott | |
| 4,682,582 | A | | 7/1987 | Zsida | |
| 5,560,196 | A | * | 10/1996 | Schlote | ...................... 60/39.35 |
| 5,758,501 | A | * | 6/1998 | Jirnov et al. | .................. 60/670 |

OTHER PUBLICATIONS

Cunha, C.M.P. and J.A.R. Parise. "Modeling of the Dynamics of a Low–Speed Gas–Liquid Heat Engine." *Solar Energy*, (1992), 48(6): 353–361.

Lindsley, E.F. "Wally Mintos' wonder wheel," (1979): 79.

* cited by examiner

*Primary Examiner*—Hoang Nguyen
(74) *Attorney, Agent, or Firm*—Ladas & Parry

(57) ABSTRACT

The engine consists of an annular array of chambers (hot leg), individually connected to an adjacent continuous condenser (cold leg), and containing a quantity of working fluid and gas—the gas usually being the fluid's own saturated vapor. When a temperature differential exists between the chambers and condenser—either by means of heat being applied to the chambers or cooling being applied to the condenser, or both—a resultant difference in vapor pressure is created; and while fluid within chambers on one lateral side is forced into the condenser, the positioning of the interconnecting ducts allows fluid to run freely from the condenser into chambers on the opposite upper lateral side. The weight imbalance and resultant torque created by such displacement of fluid causes the whole device to rotate, together with the axle to which it is secured.

11 Claims, 8 Drawing Sheets

H → HEAT IN
C → HEAT OUT

H → HEAT IN
C → HEAT OUT

ROTARY HEAT ENGINE

FIELD OF THE INVENTION

This invention relates to a rotary heat engine in which a volatile liquid is boiled or a gas heated e.g. by heat from the sun to unbalance liquid in an annular array of chambers to cause the array to rotate.

There is a constant demand in many remote rural areas, particularly in the third world, for engines that can operate pumps, generators and grinding wheels etc., and that:

1. require no fuel;
2. are reliable and easy to maintain;
3. can be easily constructed by persons with reasonable relevant skill;
4. are competitive in price, performance and ease of installation with wind and photovoltaic devices;
5. cannot stall;
6. are self-starting;
7. contain no internal valves, springs or diaphragms, etc., which can jam or fail;
8. can operate in darkness and through a wide range of weather conditions.

Rayboy's U.S. Pat. No. 4,141,218 utilizes radiant heat and consists of a sealed rotating drum, partly filled with liquid within which trapped gas bubbles are heated and thereby expanded on one lateral side, resulting in liquid displacement and torque. Some engines use a heating bath into which rotating lower containers are immersed (Minto Wheel, Schur's U.S. Pat. No. 4,121,420, Gulko's U.S. Pat. No. 4,012,911, Myers' U.S. Pat. No. 4,195,483); while many utilize one or more mechanisms such as bellows, non-return valves, cams, springs, rods, diaphragms etc., (Schur, Gulko, Myers, Gould's U.S. Pat. No. 4,570,444, Lapeyre's U.S. Pat. No. 3,984,985). However these previous inventions, together with others examined, all operate upon one or more of the following limiting conditions:

a) internal components such as valves, bellows, diaphragms, springs etc., are required;
b) heat is applied for only a limited period of time to each specific area or chamber as it rotates;
c) due to the comparatively small heat absorption area and poor area to volume ratio a considerable amount of heat is required for the engine to function;
d) the same chamber, container or area has to be alternately heated and cooled.

The present invention is not bound by such restrictions; it requires no internal moving components other than fluid and vapor, and embodies a distinct and separate condenser. Heating can be applied continuously to the whole surface area of the array of chambers (hot leg) throughout every revolution, while simultaneously the whole condenser surface area (cold leg) can be continuously cooled.

SUMMARY OF THE INVENTION

An object of the present invention is to provide a rotary heat engine in which the entire array of chambers can be heated.

A further object of the invention is to provide a rotary heat engine in which the need for cyclical heating and cooling of the array of chambers is dispensed with.

A further object of the invention is to provide a rotary heat engine with a separate condenser.

The rotary heat engine of the invention comprises a rotary member mounted for rotation about a horizontally-extending drive axis and a generally annular array of chambers mounted on said rotary member and regularly disposed about said drive axis for absorbing heat from a heat source. The array of chambers is partially filled with liquid and partially filled with gas, and a common condenser is provided for cooling fluid from and exchanging fluid with said chambers. The condenser is distinct from the array of chambers. The engine further comprises a regular array of passageways each communicating between the common condenser and a respective one of the chambers, the passageways being circumferentially offset from the chambers for selectively trapping gas in chambers on one side of said drive axis. Hence an imbalance of liquid is maintained in the array of chambers which drives the rotary member.

The condenser and chambers are preferably constructed of a strong and effective heat conductive material such as steel, copper or aluminum; whereas the connecting ducts are made of a poorly conductive material such as plastic.

The chambers and condenser are mounted and rigidly connected by spokes onto a horizontal axle which extends to supports located at either end. When there is a lateral weight imbalance within the circle of chambers, torque is created which results in rotary motion of the whole device, allowing power to be conveyed through the axle to operate machines including, but not limited to, water pumps, electric generators or grinding mills. The lateral weight imbalance is caused by displacement of a working fluid with which the device is filled in a manner and to the extent that half the chambers and the whole of the condenser are full of fluid, the remaining space being occupied by gas—preferably the fluid's own saturated vapour.

A weight imbalance occurs when a temperature differential exists between the chambers (hot leg) and condenser (cold leg), such temperature differential being created when heat is applied to the chambers or cooling applied to the condenser, or both. The higher temperature in the chambers results in the production and expansion of vapor therein with a consequent increase in pressure. The connecting ducts are so arranged that on one lateral side the expanding vapor forces out any fluid within the chambers on that side through the ducts into the condenser, while simultaneously on the other upper lateral side there is a concurrent interchange of vapor and fluid, with vapor escaping from the chambers to the condenser while fluid flows freely from the condenser into the chambers. The result is a greater weight of fluid on one lateral side than the other; and this imbalance, with its resultant torque and rotary motion of the device, will continue so long as a temperature differential exists. If a greater power output is required without increasing the engine's diameter, this can be achieved by extending the width (as measured in the direction of the rotary axis) of the chambers, thereby enabling a greater volume of working fluid to be utilized. The width of the condenser can similarly be increased to achieve the optimum surface area compatible with the amount of working fluid and method of cooling to be used.

Although the engine functions most efficiently when the liquid boils in the chambers rotating upwards, it will continue to operate when the fluid is not boiling, so long as a sufficient temperature differential is maintained between the chambers and condenser. The consequent difference in pressure within the system will always cause a pocket of vapor to form, or some gas to come out of solution, at the top of the chambers rotating upwards. The subsequent heat-induced expansion of such trapped vapor/gas pockets will cause fluid displacement and consequent maintenance of a continuous weight imbalance.

DESCRIPTION OF THE PREFERRED EMBODIMENTS

Figure 1:
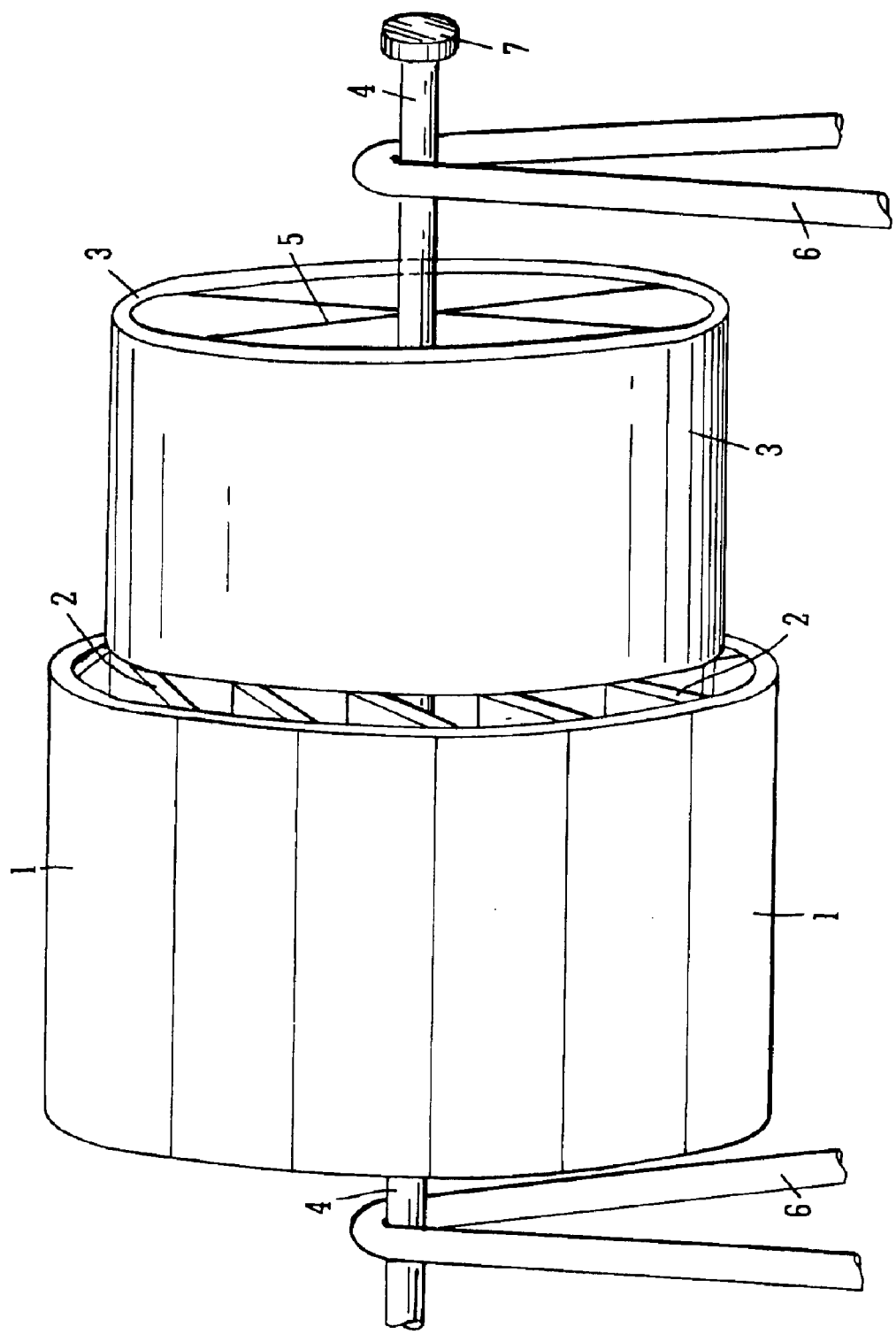
FIG. 1 is a perspective view of the engine without glass covering, mirrors or shade screen.
Figure 2:
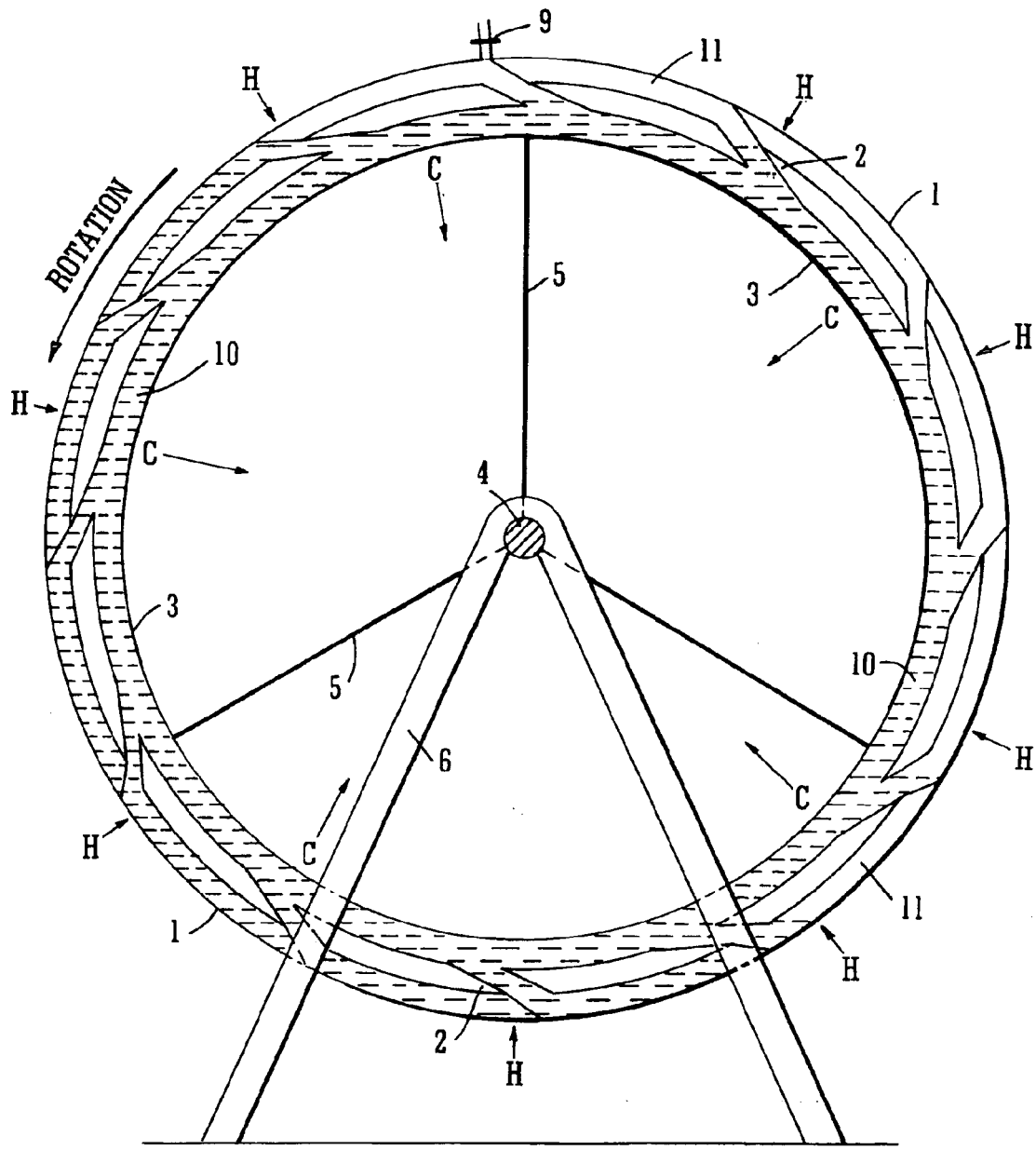
FIG. 2 is a cross-sectional view of the engine, with no glass covering, mirrors or shade screen, but containing a filling valve.

Referring to FIGS. 1 and 2 the drawings illustrate an engine containing, but not restricted to, an annular array of twelve circumferentially elongated shallow chambers 1, each individually sealed except for respective angled ducts 2 which connect each chamber 1 to an adjacent circular rectangular or similarly shaped sealed shallow condenser 3; such shallowness being utilized to provide efficient surface to volume heating and cooling ratios. As shown in FIG. 1, the ducts 2 have the same width (measured in the direction of the axis of rotation) as the chambers 1 and thereby ensure efficient fluid communication between the chambers. The chambers 1 are elongate in the above direction in order to maximise the heated surface area. The chambers 1 and condenser 3 are manufactured of a good heat conducting material such as steel or aluminum, while the ducts 2 are made of a poorly conducting material such as plastic. The device is secured at both ends by spokes 5 to the axle 4 which is mounted through bearings (not shown) at both ends of the device on support mountings 6 allowing easy rotation of the axle 4 from which power can be transferred e.g. by a pulley 7 to any suitable machine.

Figure 3:
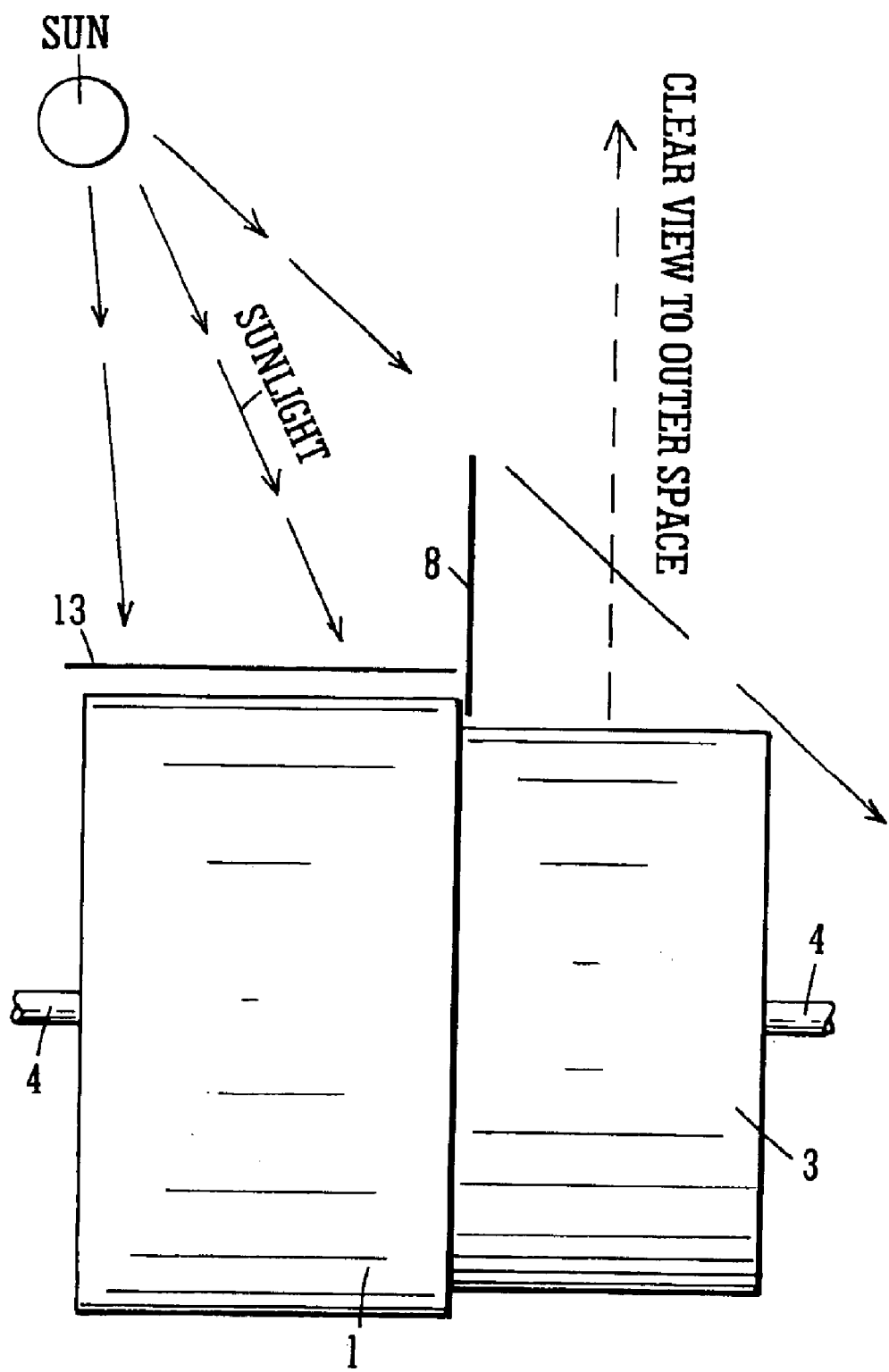
FIG. 3 shows a side view of the chambers and condenser, fitted with a glass cover and shade screen which blocks the sun's rays from striking the condenser while allowing clear vertical line of sight from the condenser's upper surface to outer space.
Figure 9:
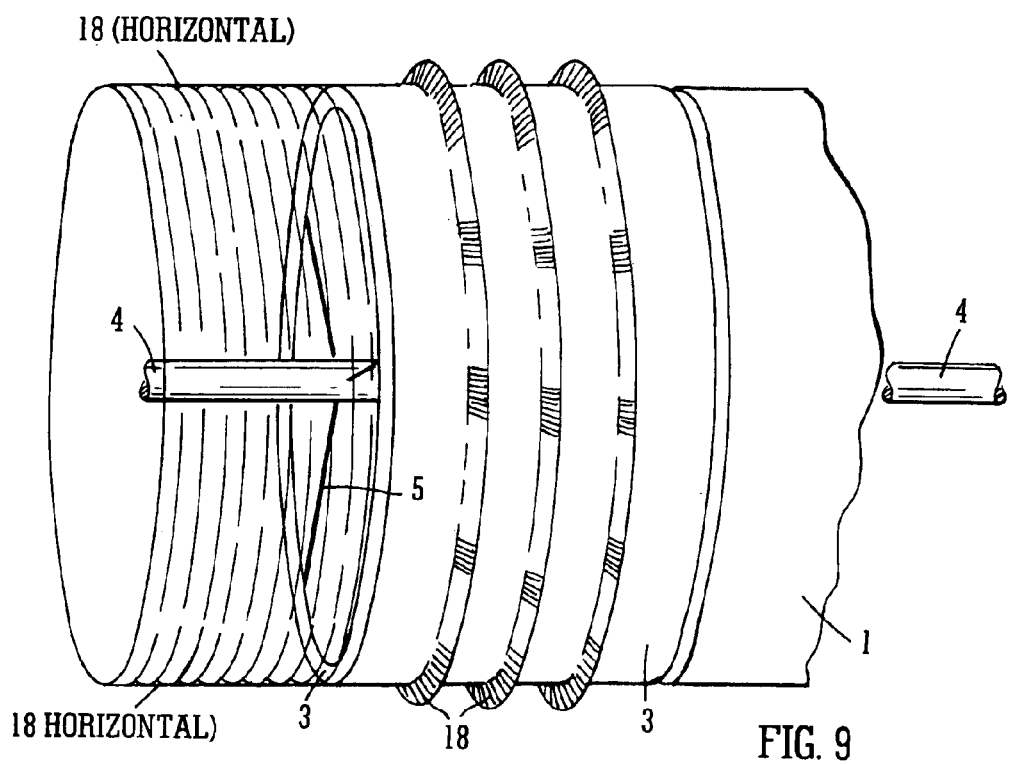
FIG. 9 shows a section of the condenser fitted with cooling fins.
Figure 10:
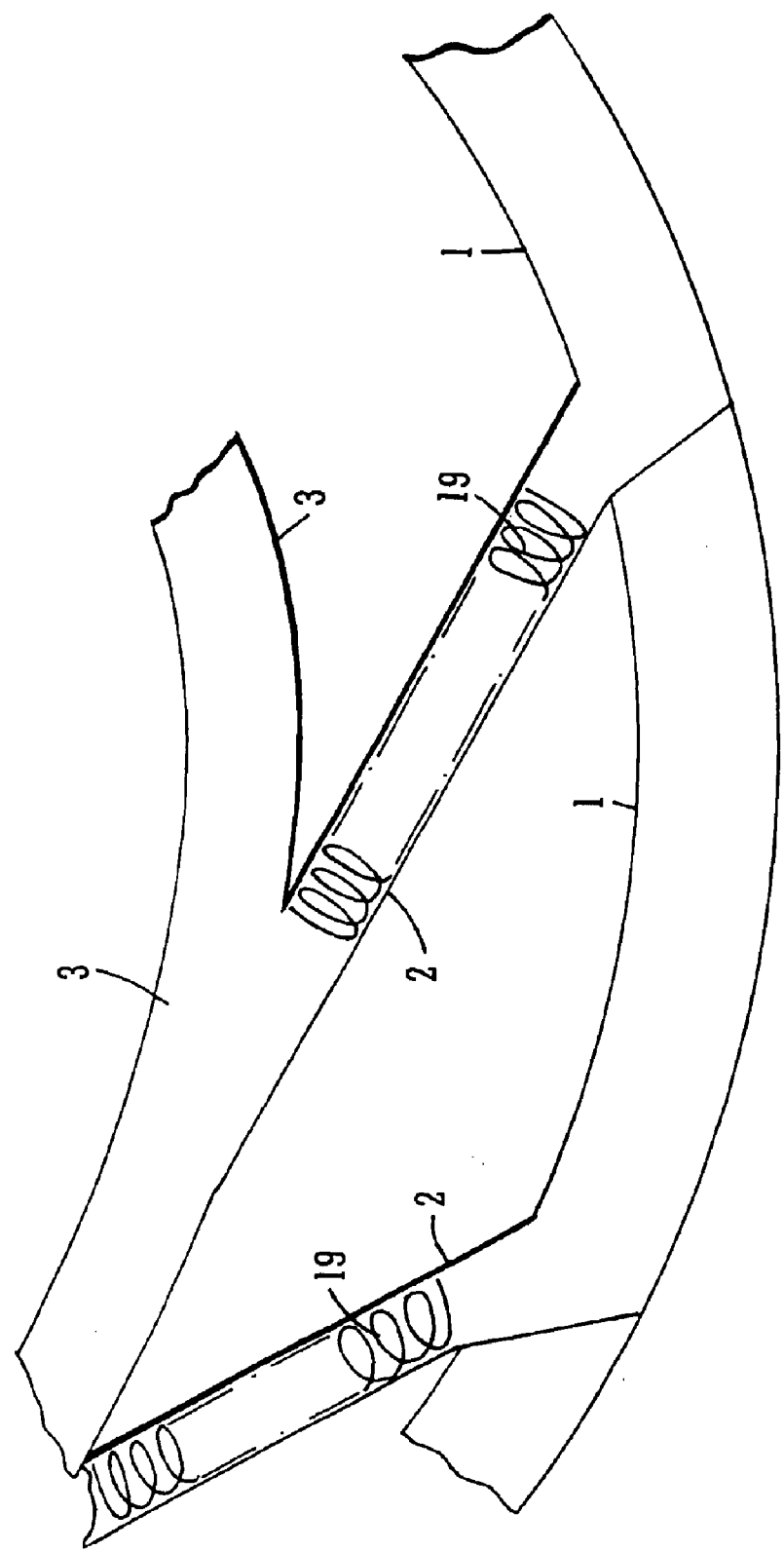
FIG. 10 illustrates a wire mesh type regenerator fitted within one of the interconnecting ducts.

The outer surfaces of the chambers 1 are treated with a black heat absorbing coating, except for the surfaces facing the axle 4 which, if not absorbing heat by means of additional angled mirrors (not shown) should be covered with an insulating material (not shown) to prevent heat loss. All the surfaces of the condenser 3 are treated with a black coating to enhance heat loss, either by giving up heat to the surrounding air, or, at night, by radiating heat to the heat sink of outer space. To prevent sunlight falling on the condenser 3, a shade screen 8 as illustrated in FIG. 3 is fitted so that the condenser 3 remains in shade during the day but has clear vertical line of sight from its upper surface to outer space at night. Additional components such as regenerators 19 and cooling fins 18 as illustrated in FIGS. 9 and 10 can be fitted if required. Regenerators 19 positioned within the interconnecting ducts 2 enhance heat transfer by alternately acquiring heat during the engine's upward rotation and then giving it up to cooled fluid 10 entering chambers 1 on the downward side. Attached fins 18, either horizontal or vertical as illustrated in FIG. 9, increase the surface area of the condenser 3 thereby improving either convective or radiant cooling.

Through the valve 9 as illustrated in FIG. 2 the device is initially evacuated by means of a vacuum pump and then filled with a quantity of low boiling point refrigerant fluid 10 such as SUVA® 123 (dichlorotrifluoroethane commercially available from DuPont) for example sufficient to ensure the maintenance of a liquid volume equal to that of the whole condenser 3 and half the chambers 1, the remaining space being occupied by the fluid's own saturated vapor 11.

Figure 4:
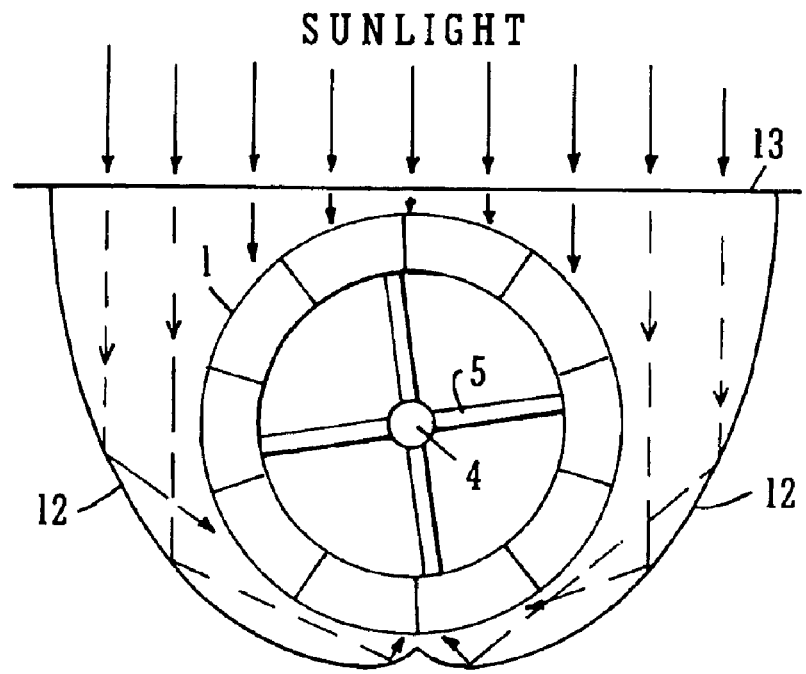
FIGS. 4 and 5 are end-on views of the train of chambers with glass covers and two possible configurations of mirror assemblies.
Figure 5:
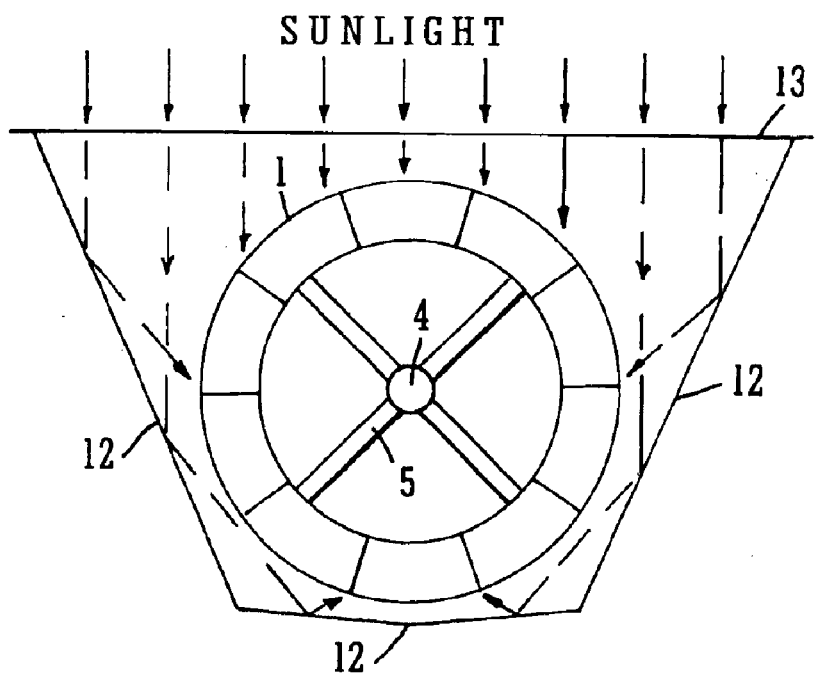

When sunlight falls upon and heats the chambers 1—such heating being enhanced by the positioning of mirrors 12 and glass covering 13 as illustrated in FIGS. 4 and 5—the fluid 10 within the chambers 1 boils and the vapor 11 expands. As can be seen in FIG. 2, the positioning of the connecting ducts 2 in relation to the chambers 1 allows vapor 11 in the chambers 1 situated on the left side to escape to the condenser 3 while simultaneously allowing cooled fluid 10 to enter—the internal circumference of the ducts 2 being sufficient to allow the concurrent outflow of vapor 11 and inflow of fluid 10. In contrast the vapor 11 within the chambers 1 on the right side cannot escape, and the increasing pressure due to additional vapor 11 production and expansion forces the fluid 10 out of the chambers 1 into the condenser 3. The result is a greater quantity and weight of fluid 10 within the left side of the device than in the right, thereby creating torque and rotary motion in an anti-clockwise direction. The cycle will continue so long as a sufficient temperature differential exists; with chambers 1 entering the lower right side having their fluid 10 expelled and chambers 1 entering the upper left side being filled under the effect of both gravity and internal pressure while their vapor 11 escapes to the cooled condenser 3 to be condensed back to fluid 10.

The engine can continue to function during the hours of darkness, particularly on hot cloudless nights. While the chambers 1 will absorb heat from the surrounding air and be prevented from radiating such acquired heat away by the glass covering 13, the upper section of the condenser 3 will be cooled by radiating heat to the heat sink of outer space, thus maintaining a temperature differential between the chambers 1 and condenser 3.

Figure 11:
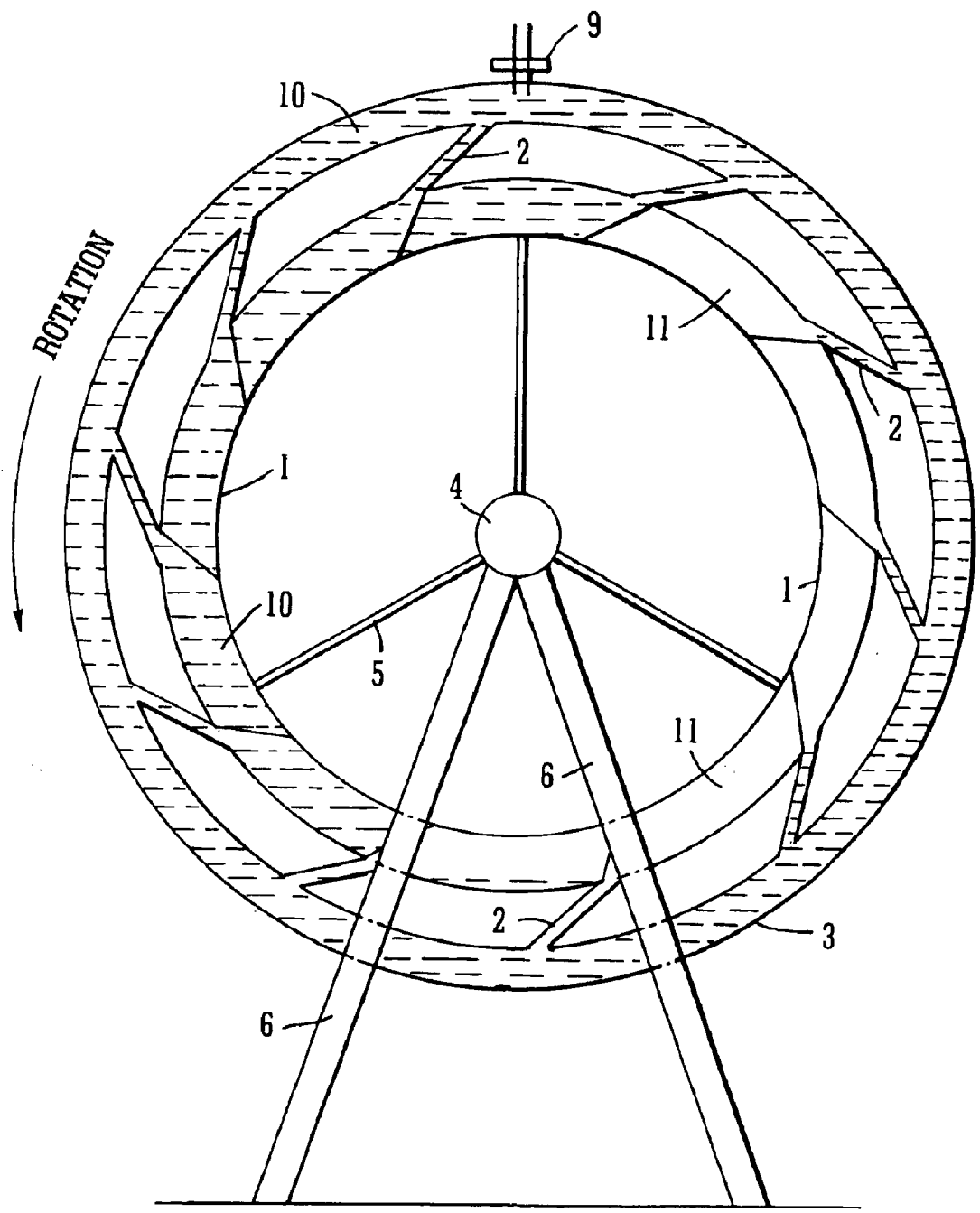
FIG. 11 shows a cross-sectional view of a differently configured engine to that illustrated in FIGS. 1 and 2 in that there are only ten chambers, and the diameter of the train of chambers is less than that of the overall condenser diameter.

As earlier stated, the engine is not limited to any particular number of chambers 1, nor to any particular overall diameter ratio between the train of chambers 1 and condenser 3. FIG. 11 illustrates a variant example of the engine containing only ten chambers 1 and a condenser 3 whose diameter is greater than that of the train of chambers 1— the opposite of that shown in FIGS. 1 and 2 although the mode of operation is identical.

Figure 6:
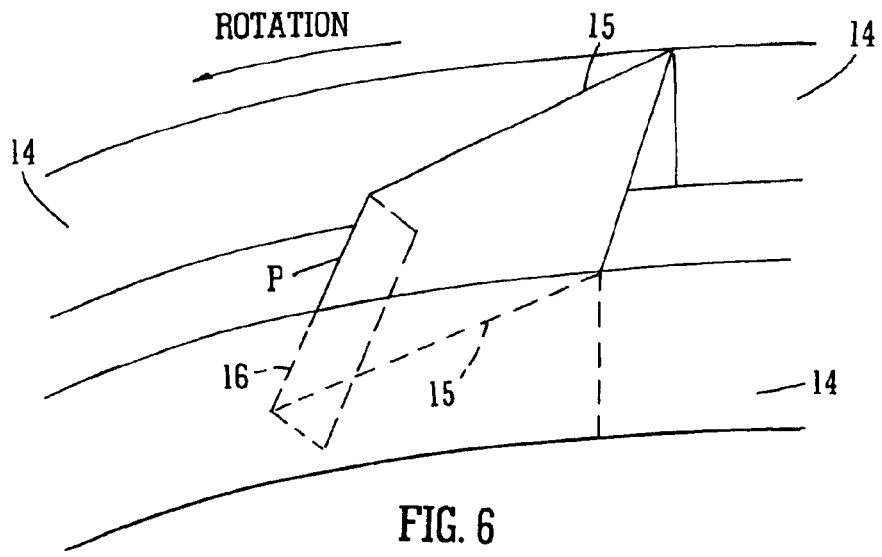
FIG. 6 is a perspective view of one of the vanes fitted on the condenser's surface between the raised edges, and showing the flap valve that can only open inwards.
Figure 7:
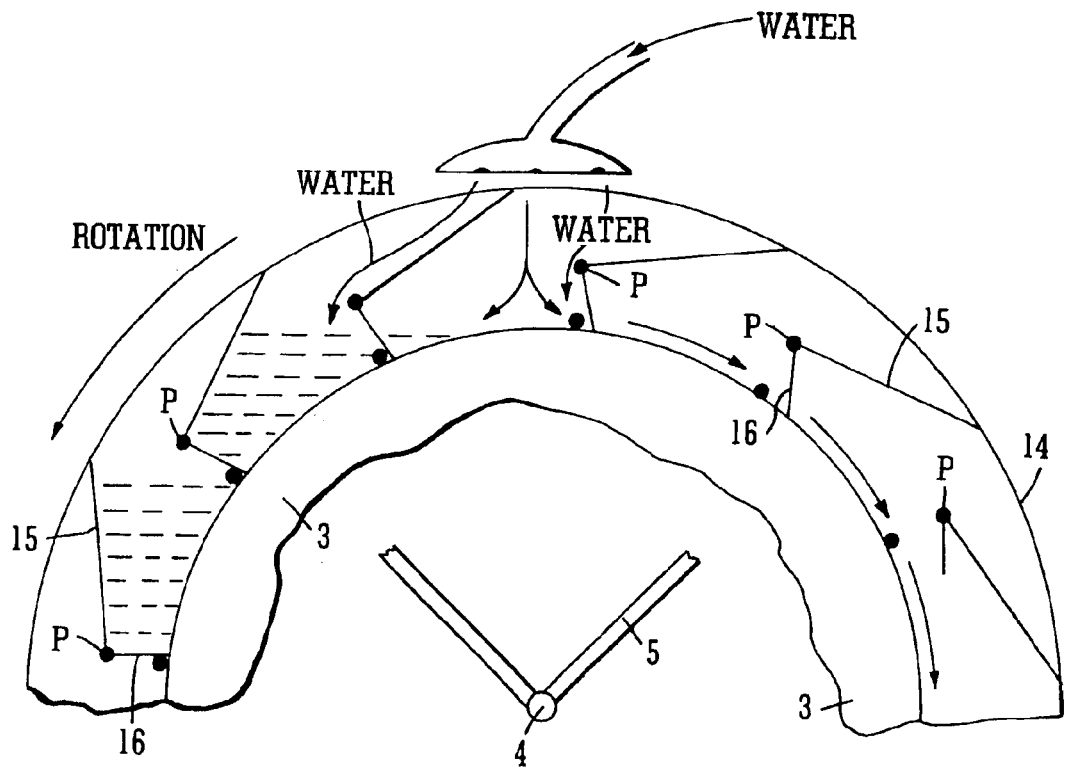
FIG. 7 is a cross-sectional view of part of the condenser with raised edges, within which are located vanes with one-way flap valves; and showing how some of the cooling water is held by the vanes on one side, but allowed to run freely down on the opposite side.

The engine can be modified to use water as a coolant, particularly if the device is operating a machine that is pumping water from a well or borehole. As such water is generally colder than the ambient temperature, a portion of the pumped water can be diverted to run over the surface of the condenser 3 in such a way that in addition to cooling the condenser 3 it is also returning some of the energy expended in pumping it to the surface. This is achieved by raising the edges 14 of the condenser 3 and fitting angled vanes 15 with one-way flap valves 16 pivoted about axis P which can only open inwards as shown in FIGS. 6 and 7. Similar to a traditional water wheel, water directed onto the top lateral side of the condenser 3 which is revolving downward is trapped in the vanes 15 until the revolution's nadir, at which point the water runs out. But water directed to the other side runs freely down the condenser's 3 surface through the flap valves 16.

Figure 8:
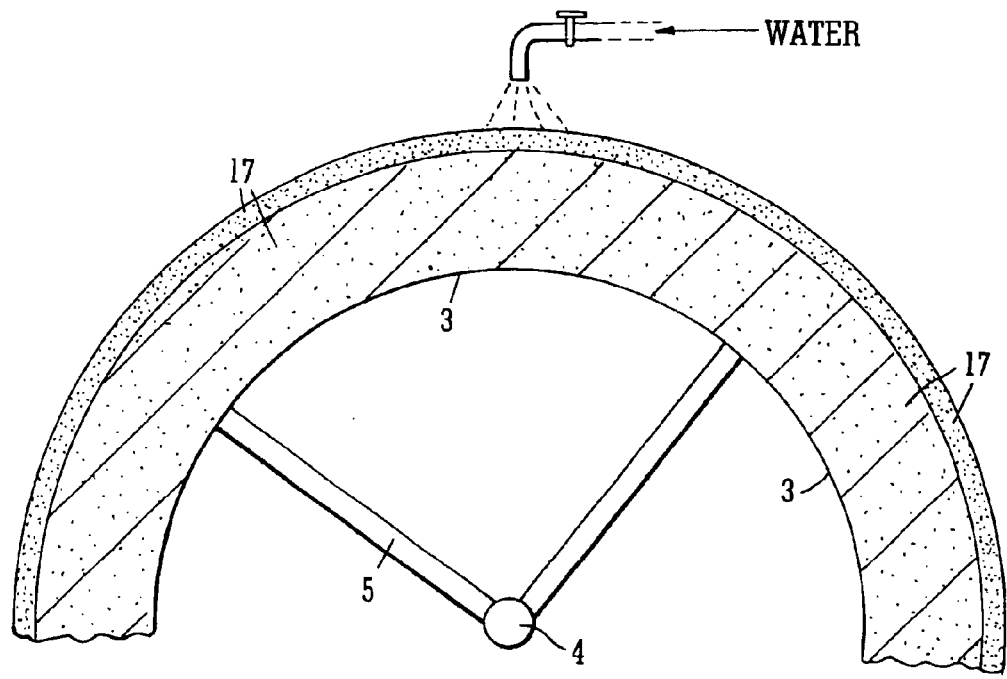
FIG. 8 is an end-on view of part of the condenser coated with an absorbent covering and illustrating the water supply to the covering to maintain dampness.

Alternatively the condenser 3 surfaces can be covered with an absorbent coating 17 and water dripped or slowly run over the surface to maintain dampness, as illustrated in FIG. 8. The resultant evaporative cooling will maintain a lower temperature within the condenser 3 than the chambers 1, particularly in locations subjected to constant breezes and high ambient temperatures.

In windless conditions an air current could be created by utilizing a small amount of power output to operate a fan.

I claim:

1. A rotary heat engine comprising:
   a) a rotary member mounted for rotation about a horizontally-extending drive axis;
   b) a generally annular array of chambers mounted on said rotary member and regularly disposed about said drive axis and exposed to sunlight for absorbing heat therefrom, said array of chambers being partially filled with liquid and partially filled with gas;
   c) a common condenser for cooling fluid from and exchanging fluid with said chambers, said condenser being distinct from said array of chambers; and
   d) a regular array of passageways each communicating between said common condenser and a respective one of said chambers, said passageways being circumferentially offset from said chambers for selectively trapping gas in chambers on one side of said drive axis to maintain an imbalance of liquid in said array of chambers which drives said rotary member.

2. A rotary heat engine as claimed in claim 1 further comprising a glass member interposed between said array of chambers and incident sunlight.

3. A rotary heat engine as claimed in claim 1 further comprising means for shading said condenser.

4. A rotary heat engine as claimed in claim 1, wherein said liquid has a boiling point below that of water and said gas is the vapor of said liquid.

5. A rotary heat engine as claimed in claim 1 further comprising means for water-cooling said condenser.

6. A rotary heat engine as claimed in claim 1 wherein said condenser is generally annular and is mounted on said rotary member.

7. A rotary heat engine as claimed in claim 1 wherein said condenser is axially offset from said array of chambers.

8. A rotary heat engine as claimed in claim 1 wherein said condenser is radially offset from said chambers.

9. A rotary heat engine as claimed in claim 1 wherein said drive axis defines a radial plane, said passageways comprise ducts extending in said radial plane, and said ducts are angularly offset in said radial plane.

10. A rotary heat engine as claimed in claim 1 wherein at least one of said passageways includes a regenerator.

11. A rotary heat engine comprising:
    a) a rotary member for rotation about a horizontally-extending axis;
    b) a generally annular array of chambers on said rotary member regularly about said axis for exposure to sunlight, absorbing heat therefrom and being partially filled with liquid and partially filled with gas;
    c) a condenser for exchanging with said chambers and cooling at least one of said liquid and gas, said condenser being distinct from said chambers; and
    d) a regular array of passageways communicating between said condenser and, respectively, said chambers, said passageways being circumferentially offset from said chambers for trapping said gas in said chambers on one side of said axis,
    whereby to maintain an imbalance of said liquid in said array of chambers for said rotation of said rotary member.

* * * * *